2,824,872
Patented Feb. 25, 1958

2,824,872

MORPHOLINO PHENYL CARBAMATES AND PRODUCTION THEREOF

Pierre Chabrier de Lassaunière, Paris, France, assignor to Les Laboratoires Dausse (Société Anonyme), Paris, France, a French company No Drawing. Application February 2, 1956
Serial No. 563,139

Claims priority, application France February 5, 1955

8 Claims. (Cl. 260—247.2)

This invention relates to phenolic organic compounds and particularly to phenyl carbamates, tertiary amino alkoxy phenylamines, tertiary amino alkoxy nitro benzenes, and tertiary amino alkoxy phenyl carbamates, and to processes for the production thereof.

A number of phenyl carbamates having a phenolic hydroxy group in the ortho position or the para position of the benzene nucleus are already known. In particular the ethyl ester of para hydroxy phenyl carbamic (or para hydroxy carbanilic) acid has already been described, and the corresponding methyl, propyl, butyl, isobutyl and isoamyl esters have been mentioned without any description of the production and properties thereof. Methyl, ethyl, propyl, isopropyl, butyl, isobutyl and isoamyl esters of ortho hydroxy phenyl carbamic acid have also been described.

It has now been found that certain tertiary-amino alkyl ethers of the above mentioned phenolic compounds, and other phenolic compounds of the same type having groups of higher molecular weight linked to the carboxy group, are valuable local anaesthetics. Amongst such tertiary amino alkyl ethers, some of them in the form of hydrochlorides show an activity from 10 to 40 times greater than that of cocaine, and a toxicity 2.5 times lower than that of cocaine.

It is an object of this invention to provide a new class of organic compounds being tertiary amino alkoxy phenyl carbamates which have a very valuable utility as anaesthetics. A further object is to provide organic compounds which have a valuable utility in being readily convertible to said carbamates. A still further object is to provide processes for the production of all the said compounds.

According to the present invention there is provided a new class of organic compounds of the general formula

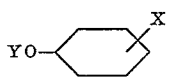

where X is a substituent in one of the ortho and para positions to the OY group and is selected from the class consisting of nitro, amino and carbamic acid ester groups, Y is a substituent selected from the class consisting of the hydrogen atom and groupings of the structure

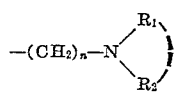

where $n$ is at least 2 and at most 3 and the residue

is selected from the class consisting of diethylamino, morpholino and piperidino groups, and the groupings X and Y contain between them at least 7 carbon atoms.

According to a main feature of this invention, there are provided alkyl and aralkyl esters of ortho and para tertiary amino alkoxy phenyl carbamic acid corresponding to the general Formula I

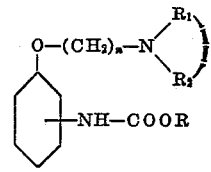

in which $n$ and

have the meanings assigned to them above and R represents an alkyl or aralkyl group, preferably a hydrocarbon radical having from 1 to 14 carbon atoms and selected from the class consisting of alkyl groups, benzyl groups and phenyl ethyl group, and the acid addition compounds e. g. the hydrochlorides, thereof.

Among the compounds just defined, the alkyl para and ortho tertiary amino alkoxy phenyl carbamates, in which the alkyl group R has 6 to 8 carbon atoms in a straight chain, and the acid addition salts thereof, e. g. hydrochlorides, are particularly important because they are very highly active as surface, local anaesthetics. In that respect para compounds are preferred; the activity is especially high in the case of 7 carbon atoms, so far as para compounds are considered; thus n-heptyl para β-morpholinyl ethoxy phenyl carbamate hydrochloride shows a surface, local anaesthetic potency which is about 30–40 times that of cocaine and twice that of Cinchocaine (hydrochloride of quinoline-2-butoxy-4-carboxylic acid β-diethylamino ethylamide) while the toxicity thereof (average fatal dose 45 mg. per kg.) is about 4.5 times less than that of Cinchocaine and 2.5 times less than that of cocaine. The corresponding β-diethylamino ethoxy phenyl carbamates in which the ester radical contains 6 to 8 carbon atoms are also especially valuable, especially at higher dosages.

Likewise n-heptyl and n-octyl ortho tertiary amino ethoxy phenyl carbamates and the acid addition salts thereof, e. g. hydrochlorides, more particularly those in which the tertiary amino group is a diethylamino, morpholino or piperidino group, are distinguished by a high surface, local anaesthetic potency.

n-Heptyl para tertiary amino propyloxy phenyl carbamates and their salts, e. g. hydrochlorides are also valuable compounds as surface local anaesthetics; among them, n-heptyl para γ-morpholino propyloxy phenyl carbamate hydrochloride has a particularly high anaesthetic potency.

Propyl p-morpholino-ethoxy phenyl carbamate hydrochloride is of a high interest inasmuch as although being weakly active as a surface, local anaesthetic, it shows a very great conduction (trunkal) anaesthetic activity, specifically one which is twice that of procaine which at this time is one of the best and more commonly employed conduction anaesthetics. It is to be noted that while the hydrochlorides are convenient for use by reason of their water-solubility, the bases of which said hydrochlorides are salts exhibit the same local anaesthetic properties and being soluble in fats may be employed for example as oil solutions thereof. When in this specification reference is made to acid addition salts, of which the hydrochlorides are merely the preferred examples, the salts may be derived from any acids which afford a therapeutically acceptable anion.

Although the foregoing refers primarily to compounds in which R contains up to 8 carbon atoms, the invention further provides higher homologues of those compounds, i. e., alkyl para tertiary amino alkoxy phenyl carbamates (or carbanilates) corresponding to Formula I but wherein R stands for an alkyl group having from 9 to 14 carbon atoms, and acid addition products, particularly hydrochlorides, of such compounds such higher homologues have acceptable anaesthetic activity.

In accordance with a further aspect of this invention, a process for the production of compounds of Formula I, comprises condensing a tertiary amino alkyl halide of general Formula II

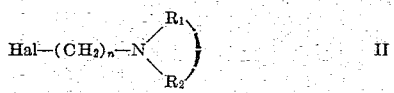

where Hal is a halogen atom and the other symbols have the meanings assigned to them above, with an alkyl or aralkyl ortho or para hydroxy phenyl carbamate of the general Formula III

where R has the meaning assigned to it above, in the presence of an agent capable of binding the hydrogen halide which is split out in the reaction.

Preferably the reaction is carried out at an elevated temperature in an anhydrous alcoholic medium containing an alkali alkoxide; it is particularly convenient to heat the reactants under reflux in an ethanol solution of sodium ethoxide, after which it is only necessary for example, to separate the sodium chloride produced, and to remove alcohol from the reaction product in order to obtain the desired ether in crude base form.

After separating the crude base, it is desirable to produce and isolate for example the hydrochloride thereof, preferably by passing dry hydrogen chloride through an ether or ketone solution of the base. Some of the bases are oils which are difficult to crystallise or distill but the hydrochlorides thereof are compounds capable of being obtained in crystalline form. However the free bases can be isolated if desired by removing the solvent from an ether solution thereof.

The compounds of general Formula III, i. e. the alkyl esters of ortho and para hydroxy phenyl carbamic acids having from 5 to 8 carbon atoms in the alkyl group, the benzyl and phenyl ethyl esters of ortho and para hydroxy phenyl carbamic acids, and the alkyl esters of para hydroxy phenyl carbamic acids having from 9 to 14 carbon atoms in the alkyl groups are compounds within the scope of the general formula first set forth as is indicated above have valuable utility in the production of compounds of Formula I.

The hydroxy phenyl carbamic acid esters of Formula III employed as starting materials in the production of compounds of Formula I may be obtained by reacting an alkyl or aralkyl chloroformate of the formula Cl COOR, where R has the meaning assigned to it above, with ortho or para amino phenol, preferably in an inert, anhydrous, organic solvent, e. g. acetone, ether or benzene.

In a further aspect of the present invention compounds of general Formula I are obtained by reacting a compound of the formula first set forth wherein X is an amino ($NH_2$) group with an alkyl chloroformate having from 1 to 14 carbon atoms in the alkyl group or with benzyl or phenyl ethyl chloroformate, preferably in an anhydrous, inert, organic medium; in this way hydrochlorides of compounds corresponding to Formula I are directly obtained.

Compounds of the general formula first set forth in which X is an amino group and accordingly Y contains at least 7 carbon atoms, as well as salts, particularly hydrochlorides, thereof are compounds within the scope of the present invention and have utility in the production of compounds of general Formula I as just set forth.

In a still further aspect of the present invention, a process for producing the compounds of the formula first set forth in which X is an $NH_2$ group comprises subjecting a compound of the said formula where X is an $NO_2$ group to reduction of that group, preferably by catalytic hydrogenation. Preferably, hydrogenation is effected in the cold at superatmospheric pressure of hydrogen in the presence of a catalyst (e. g. palladium, platinum or the like).

The aforesaid compounds of the formula first set forth in which X is nitro, as well as the salts, particularly the hydrochlorides thereof are compounds within the scope of the present invention and have specific utility as intermediates in the production of compounds of Formula I, as just set forth. The said compounds are obtained in accordance with this invention, by reacting an ortho or para nitro phenol with a tertiary amino alkyl halide, preferably chloride, in the presence of sodium alkoxide; it is desirable to work in ethanol medium.

The water-soluble salts of ethers corresponding to Formula I wherein R has from 5 to 8 carbon atoms, froth in solution, and have additional utility in various industries as capillary-active compounds. Furthermore, the ethers may also be employed for the synthesis of other compounds such as halogenalkylates.

The following examples will serve to illustrate this invention but are not to be regarded as limiting it in any way.

EXAMPLE I

*Hexyl para hydroxyphenyl carbamate*

Hexyl chloroformate (16.5 g., i. e. 0.1 mol) was added to para aminophenol (21.8 g., i. e. 0.2 mol) dissolved in anhydrous acetone (300 ml.).

The solution was heated to reflux on a water-bath for 1 hour and then cooled, and para amino phenol hydrochloride which separated during the reaction was filtered off and repeatedly washed with anhydrous acetone.

Acetone was distilled from the filtrate, and the solid residue triturated in 10 percent hydrochloric acid (50 ml.), filtered off, washed with water repeatedly, and dried over phosphorus pentoxide.

Hexyl para hydroxy phenyl carbamate (23 g.; yield 97 percent) was obtained as a crystallised, greyish substance M. P. 115° C.; after two recrystallisations from 50 percent alcohol the melting point rose to 118° C.; the compound was a white substance insoluble in water but very soluble in alcohol and acetone.

EXAMPLE II

*Hexyl p-(β-diethylamino-ethoxy)phenyl carbamate hydrochloride*

Hexyl para hydroxyphenyl carbamate (11.9 g., i. e. 0.05 mol) obtained according to Example I was dissolved in a sodium ethoxide solution containing sodium (1.15 g., i. e. 0.05 mol) in absolute alcohol (30 ml.). Beta-diethylamino ethyl chloride (7.5 g., i. e. 0.05 mol plus 10 percent excess) was added and the mixture heated to reflux on a water-bath for 1 hour.

The mixture was allowed to cool, precipitated sodium chloride was filtered off and washed with absolute alcohol repeatedly, the washing alcohol was added to the filtrate and then alcohol was removed by distillation on a water bath.

The oily residue was taken up in anhydrous ether (250 ml.), and the ether solution filtered to remove therefrom a small amount of an ether-insoluble compound. A clear, ether filtrate was obtained, which contained n-hexyl para-(β-diethylamino-ethoxy)phenyl carbamate.

With a view to converting the base into hydrochloride thereof, a stream of dry hydrogen chloride was passed through the filtrate.

Hexyl para-(β-diethylamino-ethoxy) phenyl carbamate hydrochloride separated out immediately as a slightly coloured, crystalline compound, which was filtered off, washed with anhydrous ether repeatedly, and then dried over phosphorus pentoxide. The product (14.4 g.; yield 77.4 percent) had a melting point of 144° C. which after one recrystallisation from alcohol rose to 145° C.

The hydrochloride was a white compound, very soluble in water, little soluble in cold alcohol but very soluble in hot alcohol, and insoluble in ether.

EXAMPLE III

*1-β- morpholino-ethoxy 4-nitro benzene*

β-Morpholinyl ethyl chloride (164 g., i. e. 1 mol plus 10 percent excess) was added to p-nitro phenol (139 g., i. e. 1 mol) dissolved in a sodium ethoxide solution containing sodium (23 g., i. e. 1 mol) and absolute alcohol (1200 ml.).

The mixture was heated to reflux for 1 hour, and precipitated sodium chloride was filtered off and washed repeatedly with alcohol.

The filtrate (to which washing liquids were added) was left in an ice-chest.

1-β-morpholino-ethoxy 4-nitro benzene which separated out was filtered off, washed with alcohol and then dried. There was thus obtained a crystalline, yellow compound (199 g.) having a melting point of 89° C. The hydrochloride of that compound had a melting point of 199° C.

EXAMPLE IV

*Para morpholino-ethoxy aniline*

1-β-morpholino-ethoxy 4-nitro benzene (50.4 g., i. e. 0.2 mol) prepared according to Example III was suspended in absolute alcohol (200 ml.), a 5 percent palladium catalyst (10 g.) was added to the suspension, and cold hydrogenation was effected under an initial pressure of 80 atmospheres.

Upon completion of the hydrogenation process (when the theoretical amount of hydrogen had been absorbed), the catalyst was filtered off, the alcohol removed from the filtrate and the residue distilled in a high vacuum. An amino compound distilling at 165–167° C. under a pressure of 0.4 mm. of mercury (37.9 g.) was thus collected, as a colourless liquid which set on cooling to a white, crystalline mass, darkening in air, M. P. 73° C.

The corresponding hydrochloride had a melting point of 176° C.

EXAMPLE V

*Heptyl para β-morpholino-ethoxy phenyl carbamate hydrochloride*

1-β-morpholino-ethoxy 4-amino benzene (44.1 g., i. e. 0.2 mol), prepared according to Example IV, was dissolved in anhydrous methyl ethyl ketone (200 ml.), and the solution was gradually added while stirring to heptyl chloroformate (35.6 g., i. e. 0.2 mol) dissolved in anhydrous methyl ethyl ketone (100 ml.). An exothermic reaction occurred which was moderated by cooling the mixture in a water-bath.

The compound separated out immediately as a white precipitate.

The mixture was left overnight at room temperature, and heptyl para-β-morpholino ethoxy phenyl carbamate was filtered off, washed three times with anhydrous methyl ethyl ketone and then dried in vacuo.

After one recrystallisation from anhydrous methyl ethyl ketone over animal charcoal, a crystalline, white compound (60 g.; yield 75%) having a melting point of 152° C. was obtained.

Alkyl and aralkyl ortho tertiary amino alkoxy phenyl carbamate hydrochlorides may be prepared from ortho amino phenol instead of para amino phenol via alkyl and aralkyl ortho hydroxy phenyl carbamates exactly in accordance with the processes described in Examples I and II.

The foregoing five examples illustrate, for typical specific cases, production processes having a general scope, as will be apparent from the following:

A. Working in accordance with the technique described in Example I, there were prepared the alkyl and aralkyl para and ortho hydroxy phenyl carbamates listed in the following Table I (the melting points mentioned in the tables were determined on a Maquenne block) and corresponding to the general formula

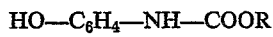

TABLE I

| Position of OH | R | Melting point (degrees C.) | Yield, percent |
|---|---|---|---|
| Para | $CH_3$ | 118 | |
| Para | $C_2H_5$ | 127 | 97 |
| Para | $n-C_3H_7$ | 104 | 84 |
| Para | $n-C_4H_9$ | 108 | 98 |
| Para | $i-C_4H_9$ | 119 | 84 |
| Para | $n-C_5H_{11}$ | 110 | 82 |
| Para | $n-C_6H_{13}$ | 118 | 97 |
| Para | $n-C_7H_{15}$ | 115 | 93 |
| Para | $n-C_8H_{17}$ | 117 | 83 |
| Para | $n-C_{10}H_{21}$ | 122 | 86 |
| Para | $n-C_{14}H_{29}$ | 124 | 51 |
| Para | $C_6H_5-CH_2$ | 160 | 84 |
| Para | $C_6H_5-CH_2-CH_2$ | 156 | 95 |
| Ortho | $C_2H_5$ | 88.5 | 92 |
| Ortho | $n-C_4H_9$ | 89 | 94 |
| Ortho | $n-C_6H_{13}$ | 57–58 | 89 |
| Ortho | $n-C_7H_{15}$ | 55 | 97 |
| Ortho | $n-C_8H_{17}$ | 59 | 82 |
| Ortho | $C_6H_5-CH_2$ | 117 | 90 |

Generally speaking, the ortho and para hydroxy phenyl carbamates are white, crystalline compounds: the lower members of the series are only slightly soluble in cold water but soluble in hot water; the others are insoluble in water, even hot water; all of them are very soluble in alcohol except tetradecyl para hydroxy phenyl carbamate and are very soluble in acetone; in order to recrystallise the compounds, it is convenient to employ a mixture of water and alcohol in varying proportions according to the compound.

B. Working in accordance with the technique described in Example II, there were produced the alkyl and aralkyl ortho tertiary amino ethoxy phenyl carbamate hydrochlorides which are listed in the following Table II and which correspond to the general formula

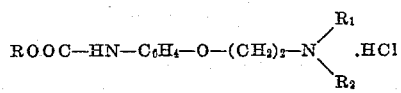

TABLE II

| R | $-N\begin{matrix}R_1\\R_2\end{matrix}$ | Melting point (degrees C.) | Yield, percent |
|---|---|---|---|
| $C_2H_5$ | diethylamino | 152 | 71 |
| $n-C_4H_9$ | do | 122 | 47 |
| $n-C_6H_{13}$ | do | 70 | 55 |
| $C_6H_5-CH_2$ | do | 120 | 39 |
| $C_2H_5$ | morpholino | 222 | 93 |
| $n-C_4H_9$ | do | 158 | 94 |
| $n-C_6H_{13}$ | do | 116 | 96 |
| $n-C_7H_{15}$ | do | 128 | 82 |
| $n-C_8H_{17}$ | do | 137 | 78 |
| $C_6H_5-CH_2$ | do | 188 | 79 |
| $C_2H_5$ | piperidino | 182 | 95 |
| $n-C_4H_9$ | do | 145 | 94 |
| $n-C_6H_{13}$ | do | 121 | 17 |
| $n-C_7H_{15}$ | do | 111 | 60 |
| $n-C_8H_{17}$ | do | 106 | 58 |
| $C_6H_5-CH_2$ | do | 190 | 85 |

Most hydrochlorides listed in the above table are soluble in water but insoluble in ether, and it is generally desirable to recrystallise them from ethyl acetate.

The corresponding bases are uncrystallisable, undistillable oils.

C. Working in accordance with the technique described in Example II or Example V, there were produced the alkyl and aralkyl p-tertiary-amino-alkoxy phenyl carbamate hydrochlorides listed in the following Table III and corresponding to the general formula

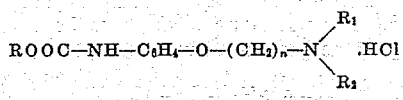

points or brownish, uncrystallisable oils; they are insoluble in water but soluble in alcohol and ether. The hydrochlorides thereof are crystalline, clear-yellow substances having well-defined melting points; they are soluble in water, only slightly soluble in cold methyl or ethyl alcohol but very soluble in hot methyl or ethyl alcohol.

TABLE III

| R | $n$ | $-N\begin{smallmatrix}R_1\\R_2\end{smallmatrix}$ | Melting point (degrees C.) | Yield (method of example)— 2 | Yield (method of example)— 5 | Base M. P. (degrees C.) |
|---|---|---|---|---|---|---|
| | | | | Percent | Percent | |
| $C_2H_5$ | 2 | diethylamino | 151–152 | 68 | | |
| n-$C_3H_7$ | 2 | do | 154–155 | 71 | | |
| n-$C_4H_9$ | 2 | do | 162–163 | 70 | | |
| i-$C_4H_9$ | 2 | do | 155 | 58 | | |
| n-$C_5H_{11}$ | 2 | do | 146 | 68 | | |
| n-$C_6H_{13}$ | 2 | do | 148 | 78 | | |
| n-$C_7H_{15}$ | 2 | do | 132 | 55 | | 59 |
| n-$C_8H_{17}$ | 2 | do | 135 | 81 | | 61 |
| n-$C_{10}H_{21}$ | 2 | do | 110 | 53 | | 48 |
| n-$C_{14}H_{29}$ | 2 | do | 117 | 64 | | 61 |
| $C_6H_5$—$CH_2$ | 2 | do | 196 | 85 | | |
| $C_6H_5$.$CH_2$—$CH_2$ | 2 | do | 123 | 56 | | |
| $CH_3$ | 2 | morpholino | 225 | | 70 | |
| $C_2H_5$ | 2 | do | 174 | 64 | | 92 |
| n-$C_3H_7$ | 2 | do | 178 | | | 104 |
| n-$C_4H_9$ | 2 | do | 146 | 78 | | 94 |
| i-$C_4H_9$ | 2 | do | 175 | 69 | | |
| n-$C_5H_{11}$ | 2 | do | 145 | 86 | | |
| n-$C_6H_{13}$ | 2 | do | 147 | 76 | | 64 |
| n-$C_7H_{15}$ | 2 | do | 153 | | 75 | 67 |
| n-$C_8H_{17}$ | 2 | do | 155 | 77 | | 68 |
| n-$C_{10}H_{21}$ | 2 | do | 159 | 29 | | 78 |
| $C_6H_5.CH_2$ | 2 | do | 190 | 63 | | 103 |
| $C_2H_5$ | 3 | do | 220 | 58 | | 121 |
| n-$C_3H_7$ | 3 | do | 219 | | | 107 |
| n-$C_4H_9$ | 3 | do | 204 | 82 | | 90 |
| n-$C_5H_{11}$ | 3 | do | 190 | 52 | | 80 |
| n-$C_6H_{13}$ | 3 | do | 186 | 54 | | |
| n-$C_7H_{15}$ | 3 | do | 180 | 45 | | 88 |
| $C_6H_5.CH_2$ | 3 | do | 220 | 39 | | |
| $C_2H_5$ | 2 | piperidino | 182 | 65 | | |
| n-$C_4H_9$ | 2 | do | 146–147 | 47 | | |
| n-$C_5H_{11}$ | 2 | do | 144 | 47 | | |
| n-$C_6H_{13}$ | 2 | do | 160 | 46 | | |
| n-$C_7H_{15}$ | 2 | do | 157 | 58 | | |
| n-$C_8H_{17}$ | 2 | do | 159 | 56 | | 58 |
| n-$C_{10}H_{21}$ | 2 | do | 143 | 82 | | |
| n-$C_{14}H_{29}$ | 2 | do | 144 | 69 | | 78 |
| $C_6H_5$—$CH_2$ | 2 | do | 182 | 73 | | |
| $C_6H_5.CH_2.CH_2$ | 2 | do | 178 | 49 | | 106 |

Some of the alkyl and aralkyl p-tertiary-amino-alkoxy phenyl carbamates are solid, white compounds capable of being recrystallised from mixtures of water and alcohol in varying proportions, and having relatively low melting point (as apparent from the table); others are uncrystallisable oils. All are soluble in alcohol and ether but insoluble in water, even hot water.

The hydrochlorides thereof are white, crystalline compounds, having higher melting points than the corresponding bases, soluble in water but insoluble in ether.

D. Working in accordance with the technique described in Example III, where were produced the p-tertiary-amino alkoxy nitro benzenes listed in the following Table IV and corresponding to the general formula

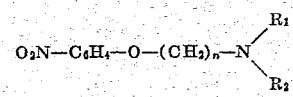

TABLE IV

| $-N\begin{smallmatrix}R_1\\R_2\end{smallmatrix}$ | $n$ | Base, Melting point (degrees C.) | Yield, Percent | Hydrochloride, Melting point (degrees C.) |
|---|---|---|---|---|
| diethylamino | 2 | oily substance | | 164 |
| morpholino | 2 | 89° | 79 | 199 |
| Do | 3 | 84° | 69 | |
| piperidino | 2 | 66° | 36 | |

Most of the para nitro tertiary amino ethoxy benzenes are crystalline, yellow compounds having low melting E. Working in accordance with the technique described in Example IV, there were produced the p-(tertiary-amino-alkoxy) amino benzenes listed in the following table and corresponding to the general formula

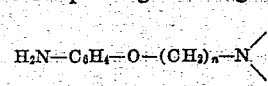

and also the hydrochlorides thereof.

TABLE V

| $-N\begin{smallmatrix}R_1\\R_2\end{smallmatrix}$ | $n$ | Base Melting point (degrees C.) | Base Boiling point (degrees C.) | Yield, percent | Hydrochloride, Melting point (degrees C.) |
|---|---|---|---|---|---|
| diethylamino | 2 | | 135–136°/0.5 mm | 57 | 145 |
| morpholino | 2 | 73 | 165–167°/0.4 mm | 85 | 176 |
| Do | 3 | 49 | 180–181°/0.8 mm | 87 | |
| piperidino | 2 | 65 | 145–146°/0.09 mm | 90 | |

Most of the para tertiary amino alkoxy anilines are crystalline, white compounds, or colourless oils capable of being distilled in a high vacuum; they are soluble in water, alcohol, ether and acetone. The hydrochlorides thereof are crystalline, white substances which become brown in air and are soluble in water, only slightly soluble in cold alcohol, but very soluble in hot alcohol.

The basic ethers corresponding to herewith general Formula I can be converted to salts of acids other than hydrochloric acid, particularly other acids as have already been proposed or employed for producing acid addition salts from anaesthetic bases. Such other salts also form a part of this invention.

I claim:

1. A compound selected from the class consisting of compounds of the general formula

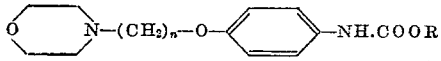

where $n$ is at least 2 and at most 3, and R is an alkyl group having from 1 to 14 carbon atoms, and the acid addition salts thereof.

2. A compound according to claim 1 wherein R is an alkyl group of 6 to 8 carbon atoms.

3. A compound selected from the class consisting of n-heptyl para β-morpholino ethoxy phenyl carbamate and the hydrochloride thereof.

4. A compound selected from the class consisting of propyl para β-morpholino ethoxy phenyl carbamate and the hydrochloride thereof.

5. A process for the production of basic phenyl carbamates, wherein a morpholino alkly halide

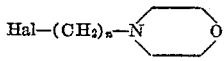

where $n$ is at least 2 and at most 3, is reacted with a compound of the formula

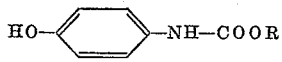

where R is an alkyl group having from 1 to 14 carbon atoms, in the presence of an agent capable of binding the hydrogen halide formed in the reaction.

6. A process as claimed in claim 5, wherein the reaction is carried out at an elevated temperature in an anhydrous alcoholic medium containing an alkali metal.

7. A process as claimed in claim 5, wherein the reactants are heated to reflux in an ethanol solution of sodium ethoxide, the sodium halide thus formed is separated, and alcohol is removed from the reaction solution.

8. A process as claimed in claim 5, wherein the reaction product, after having been isolated, is dissolved in ether, and dry hydrogen chloride is passed through the ether solution to produce a hydrochloride.

References Cited in the file of this patent

UNITED STATES PATENTS 2,552,241    Weissberger _____ May 8, 1951

OTHER REFERENCES

Tominaga: Chemical Abstracts, vol. 17, page 3719 (2), 1923.

Kaye et al.: Journal of Organic Chemistry, vol. 16, pp. 1421–6, 1951.